(12) United States Patent
Brochonski

(10) Patent No.: US 12,120,216 B2
(45) Date of Patent: Oct. 15, 2024

(54) SECURE PROCESS FOR VALIDATING MACHINE LEARNING MODELS USING HOMOMORPHIC ENCRYPTION TECHNIQUES

(71) Applicant: Unify Patente GmbH & Co. KG, Munich (DE)

(72) Inventor: Michael Brochonski, Curitiba (BR)

(73) Assignee: Unify Patente GmbH & Co. KG, Munich (DE)

( * ) Notice: Subject to any disclaimer, the term of this patent is extended or adjusted under 35 U.S.C. 154(b) by 310 days.

(21) Appl. No.: 17/747,031

(22) Filed: May 18, 2022

(65) Prior Publication Data

US 2022/0385449 A1    Dec. 1, 2022

(30) Foreign Application Priority Data

May 25, 2021  (EP) ..................... 21175794

(51) Int. Cl.
*H04L 9/00*  (2022.01)
*G06N 20/00* (2019.01)

(52) U.S. Cl.
CPC ............. *H04L 9/008* (2013.01); *G06N 20/00* (2019.01)

(58) Field of Classification Search
CPC ............................... H04L 9/008; G06N 20/00
USPC ....................................................... 713/189
See application file for complete search history.

(56) References Cited

U.S. PATENT DOCUMENTS

| | | | | |
|---|---|---|---|---|
| 2019/0332814 A1* | 10/2019 | Bos | ........................ | G06F 21/64 |
| 2020/0075040 A1* | 3/2020 | Provost | .................. | G06N 3/044 |
| 2020/0320206 A1* | 10/2020 | Cammarota | ............ | G06F 21/57 |
| 2020/0358611 A1* | 11/2020 | Hoang | .................. | H04L 9/3231 |
| 2021/0319353 A1* | 10/2021 | Sarpatwar | ............. | H04L 9/3297 |

OTHER PUBLICATIONS

European Search Report for EP21175794.3 dated Nov. 15, 2021.
A Privacy-Preserving Principal Component Analysis Outsourcing Frame Work by Xinbo Liu, et al., 2018 17th IEEE International Conference on Trust, Security and Privacy in Computing and Communications/12th IEEE International Conference on Big Data Science and Engineering; Aug. 1, 2018.
Efficient Logistic Regression on Large Encrypted Data by Kyoohyung Han, et al., IACR, International Association for Cyrptologic Research; server date Jul. 10, 2018; downloaded by EPO Jul. 26, 2018.
"FeARH: Federated machine learning with Anonymous Random Hybridization on Electronic Medical Records" by Jianfei Cui, et al.; arxiv.org, Cornell University Library, 201 Online Library Cornell University Ithaca, NY, Dec. 25, 2019.

* cited by examiner

*Primary Examiner* — Bryan F Wright
(74) *Attorney, Agent, or Firm* — Buchanan Ingersoll & Rooney PC

(57) ABSTRACT

Methods and systems for secure validation of a machine learning model can facilitate encryption of a machine learning model and evaluating the performance of the model. Validation data can be encrypted and processed by the machine learning model so that results of the model's processing can be received and evaluated to evaluate how the machine learning model functioned.

19 Claims, 3 Drawing Sheets

SECURE PROCESS FOR VALIDATING MACHINE LEARNING MODELS USING HOMOMORPHIC ENCRYPTION TECHNIQUES

CROSS-REFERENCE TO RELATED APPLICATIONS

The present application claims priority to European Patent Application No. EP 21 175 794.3 filed on May 25, 2021. The entirety of this European Patent Application is incorporated by reference herein.

FIELD

The present invention relates to a method and a system for secure validation of machine learning models and parallel validation data using homomorphic encryption.

BACKGROUND

Various cryptographic methods are known from the state of the art which can be used for different purposes. One of these purposes is to present a secure process to execute transactions with two assets e. g. Machine Learning models which comprise code or algorithms and datasets containing useful information for training, classification and data analysis. Typically, in such a transaction process a user is interested in acquiring a machine learning model from a vendor or provider with which the user can evaluate or validate specific data.

However, the process of a secure transaction is important to all parties in several ways. For the user interested in acquiring the machine learning model it is of importance to ensure that pre-trained machine learning models can be validated with the dataset of the interested user, ensuring that the target model has the desired accuracy and efficiency. The data set used for the validation of the machine learning model should remain encrypted to ensure that it is not modified. In addition, the results should be encrypted so that they cannot be manipulated.

The user is particularly interested in the fact that sensitive information can remain securely in the data set without having to be removed or masked. This is necessary in environments where particularly sensitive information needs to be protected, for example in healthcare or financial data.

For the machine learning model provider, it is important that while the interested user can validate or test the model, no implementation details are disclosed during this phase of the transaction.

In the state of the art, there are various approaches making such a transaction process more secure. For instance, cryptography may be applied to a pre-trained machine learning model and dataset may be used for validation of said model. Zero-knowledge technique applied on arguments can be used for this purpose. With this technique, an unencrypted validation dataset from an interested user, who wants to acquire a machine learning model is given to the provider of the model. The model provider can use said zero-knowledge arguments to prove that the pre-trained machine learning model is contained within. This can be done as there is one specific result as output without revealing the machine learning model parameters.

In a different scenario Secure Multiparty Computation can be used as a secure measure to protect the machine learning model parameters. However, protecting the whole model is non-trivial. To achieve this, both interested parties share the machine learning system structure, the model's weights and validation dataset remain hidden to each other.

Zero-Knowledge and Multiparty Computation are machine learning models that were trained unencrypted with an unencrypted dataset, the encryption is applied after training the models. This also applies to the dataset that is going to be used for validation.

In other techniques cryptography being applied on a model that is going to be trained and a dataset being used for training said model. These models go through their whole training phase with encrypted model and encrypted dataset. Typically, the training dataset is generally much larger than a validation dataset. This entails in practice that these techniques are computationally much more expensive than Zero-Knowledge or Multiparty Computation. Costs grow the more complex the machine learning model becomes and the larger the dataset is. This means for many models or said datasets that these techniques may become infeasible as a limiting factor for cost, time or both.

U.S. Patent Application Publication No. 2019/0332814 A1 describes training of machine learning systems with just the model fully encrypted while trying to use hardware-specific nodes to reduce the high computational cost this ensues.

SUMMARY

It was determined that the known state-of-the-art techniques for secure processes for validating machine learning models each have some drawbacks as discussed below in more detail. For example, in the case of Zero-Knowledge parameters the interested user who owns the dataset must disclose the information without cryptography for the processing to be possible. The issue in this manner is that only one of the parties is protected which is the provider who owns the machine learning model. End-to-end protection is not possible for both parties.

The Secure Multiparty Computations approach holds two main drawbacks, one related to communication, the second regarding to machine learning model limitations. When using this approach both interested parties must be online, that is, having a permanent connection while the processing/validation is being performed. This discards the possibility of doing the validation on an offline/intranet environment which may be necessary if one of the parties wishes to assess performance or can only test in one such environment e. g. Embedded System. The second issue goes into limitations of this approach to hide some elements of the machine learning model. It is a non-issue to hide weights and the validation dataset information. But hiding the whole machine learning model (topology, hyperparameters) is not trivial and may not even be possible depending on which approach and modeling the machine learning model in question uses for solving a certain problem. Another issue when not applying cryptography to the whole model is the higher sensitivity to extraction attacks.

Prior art as shown, for example, in US 20190332814 A1 do not protect input data entering the machine learning model. All data involved in the transaction process is not protected with encryption. As stated, solutions described in US 20190332814 A1 where the machine learning is embedded need specific hardware to function as concerns with received data from an Internet of Things device. The edge node mentioned in US 20190332814 A1 is needed to enforce encryption, signature verification and decryption that is with specific proprietary hardware needs to accommodate the solution. Involved parties would need to have this hardware or use a third-party which possesses the hardware to execute the process.

Therefore, embodiments of the present invention can be based on the object to overcome the limitations of the state of the art and to provide a method and a system for a cost-effective and secure validation of machine learning models and parallel validation data.

According to an embodiment the invention, a method for secure validation of machine learning models and parallel validation data using homomorphic encryption is provided that can include the steps of:

providing a machine learning model by a provider and providing validation data by a user;
encrypting, by the provider, the machine learning model;
sending, by provider, public encryption parameter to user;
selecting, by the user and the provider, a unifying encoding method;
encrypting, by the user, the validation data;
sending, by the user, the encrypted validation data;
processing the encrypted validation data with the encrypted machine learning model;
providing encrypted results of said processing to the provider and the user; and
decrypting the results and evaluating whether the performance of the machine learning model is satisfactory with the given valuation data of the user.

According to a preferred embodiment, the method in the step of encrypting the machine learning model by the provider further comprises generating public-, secure- and/or functionality homomorphic encryption parameters; and wherein the method further comprises sending, by the provider, the homomorphic encryption parameters to user.

According to another preferred embodiment, the public homomorphic encryption parameters comprising a scheme defining the precision and efficiency of the subsequent processing of the encrypted validation data with the encrypted machine learning model, wherein the scheme is a Brakerski-Fan-Vercauteren (BFV) or a Cheon-Kim-Kim-Song (CKKS) scheme.

BFV can rely on modular and exact vectors of numbers. Ciphertext (plaintext) data is represented as modulo of the integers in a vector (each modulo defined as t). The computation refers to integer arithmetic circuits based on modulo t. The computational cost is lower than Fast Fully Homomorphic Encryption over the Torus (TFHE), albeit still higher than CKKS. This method is ideal for applications that need a precise response with no errors i. e. financial data with the trade-off of some additional computational cost.

CKKS can rely on approximate vectors of numbers. Ciphertext (plaintext) data is represented as real numbers (and complex numbers). The computation refers to floating point arithmetic. The computational cost is lower than Fast Fully Homomorphic Encryption over the Torus (TFHE) or BFV. This method is ideal for applications where very high precision is not paramount i. e. statistical models, medical data, machine learning models and most applications where high precision for floating point is not obligatory. Currently, one other scheme that could be used is Fast Fully Homomorphic Encryption over the Torus (TFHE). This method is not currently emphasized because of its high computational cost. However, according to TFHE bits are evaluated on an arbitrary Boolean circuit composed of binary gates over encrypted data, without revealing any information on this data. In short, ciphertext (plaintext) is presented as bits and computation as logic circuits. This process enables as BFV and CKKS to process the data with decryption, albeit with a higher computational cost.

According to still another preferred embodiment, the functionality homomorphic encryption parameters comprising one of cyclotomic ring, modulus (modulo) and/or level depth. The cyclotomic ring or polynomial ring is a polynomial whose coefficients are chosen from the integers, where these polynomials are computed from ($X^n$+1). In a cyclotomic ring R all the polynomials have a degree of at most (n−1), defining formally:

$$R=\mathbb{Z}[X]=(X^n+1):X^n=-1.$$

Any term which is included on ($X^n$+m), where m is an integer, this term will be reduced to modulo n plus 1. In the formal example $R=x^n=-1$ as $m$ equals zero, and the value is just flipped around the ring.

There is also the modulo ring, and this is where the modulo takes its part, which is computed as:

$$R_Q = \frac{R}{Q}$$

Its coefficients are computed as modulo Q. Coefficients at this point are no longer an integer but represented as a set of integers that are zero balanced. Zero balancing is important for computational efficiency when working with polynomials. Coefficients, in this case modulo (Q) can be chosen as a parameter. Putting into context the cyclotomic ring R is the polynomial obtained from the input data, in this scenario either the machine learning model or the input dataset for validation. Without reduction, this polynomial is computationally too expensive to be practical, so the modulo ring $R_Q$ is a reduction from the original ring R. This reduction is based on the security desired for the input into the homomorphic encryption and is defined by the size of the data input encoding (e. g. 128 bits) with its degree (n) and the modulo (Q) chosen. The degree of security can be based upon the encoding chosen with its modulo (Q) to define security hardness and how computationally expensive it is to realize this operation. The level depth can be increased and decreased by adjusting the modulo parameter (Q). This defines the amount of noise that is going to be present along the ciphertext (encrypted message). Defining the ideal modulo (Q) is hard as it is very dependent on the encryption technique being used, the size of the input (as well as the consequent polynomial generated from it from the cyclotomic ring) and the encoding chosen (i. e. 128 bits). The usual approach is to encode with a smaller Q, test its output with the unencrypted content and compare the error. If it is zero, the ideal modulo has been found for this encryption method with the desired encoding complexity.

Further, according to a preferred embodiment, the unifying encoding method uses a block size of n bits or of n=256 bits or a block size of n=128 bits. This encoding of size also named encoding complexity n or simpler block size n must be proportionally larger than the bigger modulo (Q) is. That is, for achieving a desired security level which can be calculated with n log (Q), where n is the size of the encoding and Q the modulo, n must be of a target size. This standard for security can be used, as homomorphic encryption does have this metric which has been accorded and defined and can be found on https://homomorphicencryption.org/standard/. As a rule, 256 bits is applied by default unless the computational cost is too prohibitive. This ensures by a large margin that even with a large Q, the encrypted contents remain safe.

According to still another preferred embodiment the secure homomorphic encryption parameters are tightly linked to the other homomorphic encryption parameters, from these two are key, the modulo (Q) and the encoding complexity n.

According to yet another preferred embodiment, the method in the step of encrypting, by the user, the validation data further comprises generating, by user, public keys that are going to be used during the transaction process and wherein the method further comprising the steps:

sending, by user, the encrypted validation data, and the generated public keys to the provider and processing the encrypted validation data with the encrypted machine learning model, wherein the public keys of the user are used.

According to another preferred embodiment, the step of processing the encrypted validation data with the encrypted machine learning model is repeated with another unifying coding method in case the result of the machine learning model does not meet the requirements for accuracy and efficiency.

According to still another preferred embodiment, the number of repeated processing of the machine learning model is limited to a predetermined threshold n that is to avoid the risk of extraction attacks. This threshold n is highly dependent on the complexity of the encrypted model. For simpler models a very low threshold n is advised (i.e. lower than 10 tries). In High complexity models it can scale up to the hundreds of tries. Realistically, a validation scenario would encompass one dataset or small set of datasets, so the advised limit or threshold n would be close to the number of datasets being tested times two.

Further, according to a preferred embodiment, a neural network watermarking is used to trace the machine learning model if a redistribution of the provided machine learning model is not to occur.

According to yet another preferred embodiment, the method is executed on an online external system, a public cloud solution and/or a private offline system.

According to the invention, a system for secure validation of machine learning models and parallel validation data using homomorphic encryption is provided, wherein the system is configured to perform an embodiment of the method.

According to an embodiment of the invention, the system comprising at least one of online external system, public cloud solution system and/or private offline system.

According to another preferred embodiment, the system further comprising a local system, a network system and/or cloud system configured to perform the encryption and/or decryption of the validation data. It should be appreciated that a embodiments of the system can include at least one computer device or communication device that includes hardware. Each device can include a processor connected to a non-transitory computer readable medium and at least one transceiver. The computer readable medium can be a non-transitory memory, for example. Each device can include at least one input device and at least one output device, such as, for example, a display, a touch screen display, a pointer device, a mouse, a microphone, a speaker, a stylus, a keyboard, and/or a camera.

According to another preferred embodiment, the system further comprising a local system, a network system and/or cloud system configured to perform the encryption and/or decryption of the machine learning model.

According to another preferred embodiment, the system further comprising a local system, a network system and/or cloud system configured to perform the processing of the encrypted validation data with the encrypted machine learning model.

According to the present invention, need of a specific hardware is not required. Furthermore, the present invention can, but is not limited to receiving data from Internet of Things (IoT) devices. Data according to embodiments of the proposed invention can also be fully encrypted, or partially encrypted according to need.

Embodiments of the present invention can be adapted to aim on resilience at software level, giving flexibility for both parties executing the process on a platform of choice without depending on specific "tamper resistant hardware" and offers end-to-end encryption both to the machine learning model and input data.

A user interested on acquiring a machine learning model has several advantages by the present invention. For instance, that a pre-trained machine learning model can be validated with the dataset of the user, ensuring that the target model has the desired accuracy and efficiency. The dataset that is being used for machine learning model validation can remain encrypted, ensuring that it is not modified. And further, the results are encrypted and cannot be tampered with. Any possibly sensitive information on the dataset remains secure with no need to remove or obfuscate it. This is especially useful on environments that prize especially sensitive information e. g. healthcare, financial data.

Furthermore, a Machine Learning pre-trained model can be tested on the system it is going to be deployed, confirming whether the hardware being used for processing is accordingly scaled, either as an internal system or a system in the cloud.

Moreover, costs of the data encryption/decryption can be accounted for, as the overhead of the encryption can be estimated using an unencrypted machine learning model and an unencrypted dataset with a similar batch size, wherein comparing it with its encrypted counterparts provides the desired estimation.

As both dataset and pre-trained machine learning model remain encrypted during the evaluation process, validation can be done on an external system for both parties such as a public cloud solution or the evaluation can be done on a private offline system accessible by just one of the parties.

A provider interested on supplying the machine learning model has several advantages by the present invention for instance that the Machine Learning Model can be validated by an interested user on acquiring the model without disclosing implementation details.

Furthermore, validation can occur on remote cloud systems or offline systems, if precautions are made to avoid reverse engineering or extraction attacks. After gaining access to said machine learning model for evaluation an interested user cannot copy or easily acquire implementation details of the model in a feasible way due to several mechanisms like: Machine Learning model is encrypted; Extraction attacks are not possible by limiting the number of validations/queries to the model. Details of the model are only known after the acquisition transaction has been confirmed and the interested user has access to the unencrypted machine learning model.

Moreover, after the interested user has access to the machine learning model, safety mechanisms may be in place within the model to avoid unauthorized redistribution of said model with techniques such as neural network watermarking.

The previous remarks show the advantages for both interested parties on a process to acquire machine learning models in a secure manner. They assure that the model will fit the interests of the user in terms of efficiency and accuracy for a given task and with the data available for processing on the target model. Also assured is the safety of the model as no details are given about algorithms used, parameter tuning, and model's topology. Results tampering on both sides are also restricted as both ends (Dataset and pre-trained machine learning model) are encrypted. This prevents situations such as selling a machine learning model that is not ideal for the interested user on buying it or disclosing details about the machine learning model without guarantees of a sale, exposing it to be leaked, copied or redistributed.

Other details, objects, and advantages of the telecommunications apparatus, system, device, non-transitory computer readable medium, and method will become apparent as the following description of certain exemplary embodiments thereof proceeds.

BRIEF DESCRIPTION OF THE DRAWINGS

The invention and embodiments thereof will be described below in further detail in connection with the drawing. It should be appreciated that like reference numbers can identify similar components.

DETAILED DESCRIPTION

Figure 1:
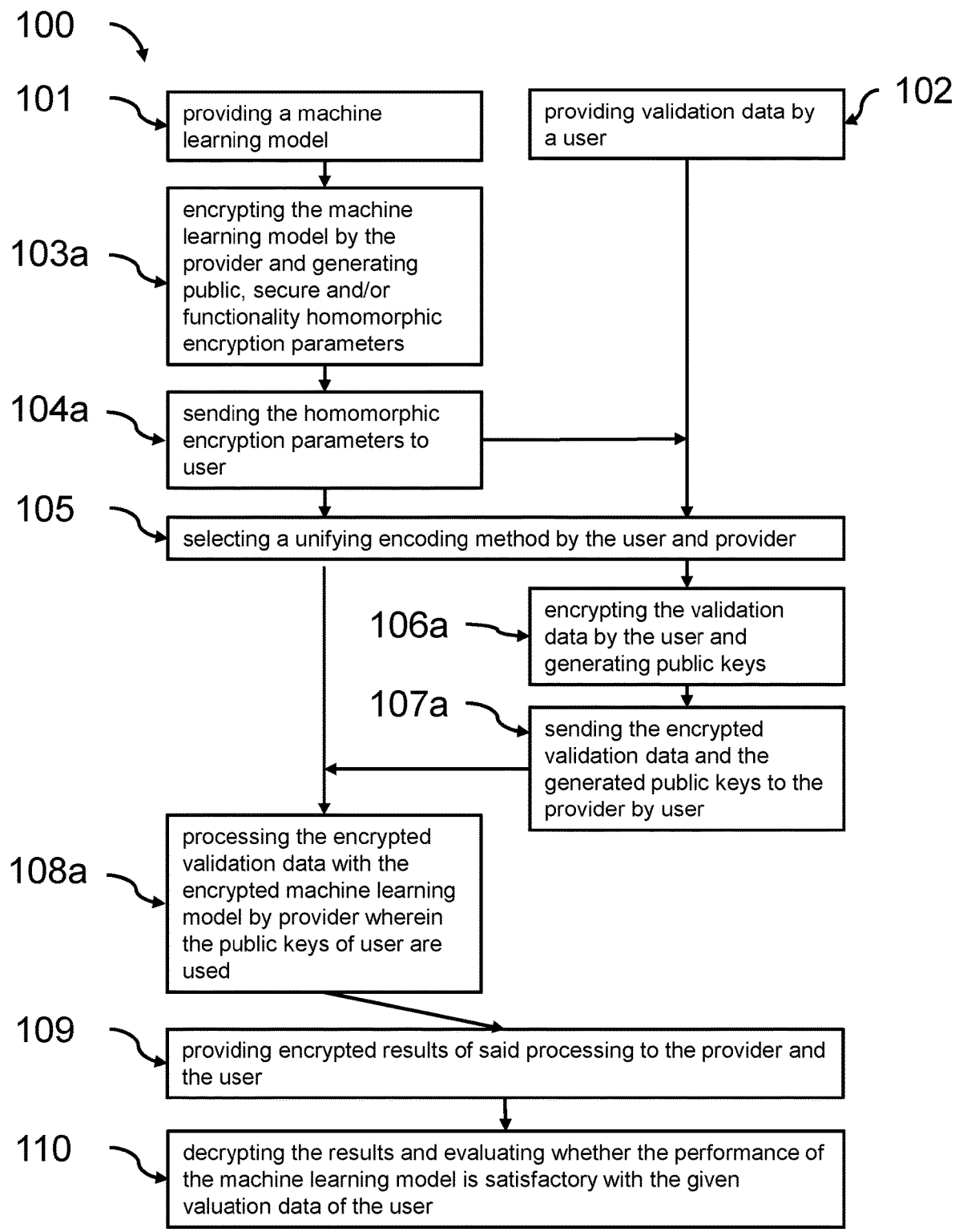
FIG. 1 is a flow chart illustrating steps of a method for secure validation of machine learning models and parallel validation data using homomorphic encryption according to an embodiment of the invention.
Figure 2:
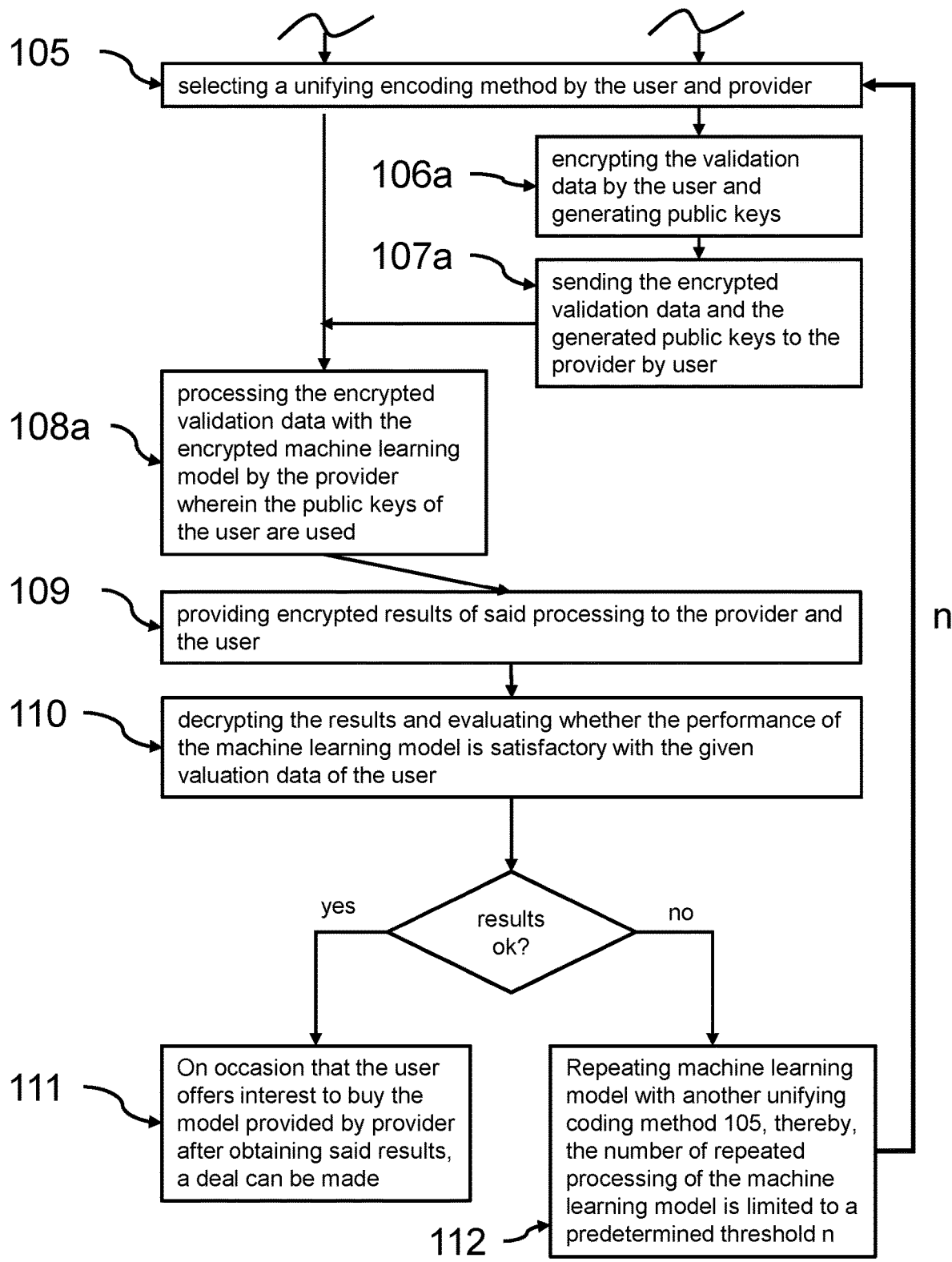
FIG. 2 is a flow chart illustrating steps of a method for secure validation of machine learning models and parallel validation data using homomorphic encryption according to an embodiment of the invention.

FIGS. 1-2 show flowcharts of the method 100 for secure validation of machine learning models and parallel validation data using homomorphic encryption according to an embodiment of the invention. In accordance with a typical transaction process, an interested user (Potential Buyer) has an interest in acquiring a machine learning model from a provider. As is the user needs assurance that the model provided by provider cover its needs, that is, the machine learning model is efficient and accurate enough with the available processing data for the user. The user wants to validate the machine learning model of interest with the provider. In the procedure the user needs a secure process where there is assurance that the results with the provided evaluation data for a model evaluation are not tampered with while also having its evaluation data kept secure if it contains privacy-sensitive information (e. g. healthcare information of patients, financial data etc.). The provider needs a process where it is possible to disclose the efficiency and accuracy of the trained machine learning model with the evaluation data provided by the user without disclosing details about said model. That is, without revealing details about its implementation, techniques and algorithms used which may lead to an intellectual loss for the provider. The flow of the process for executing a successful transaction with its technical is going to be demonstrated in FIG. 1.

Both parties, provider and user, agree to do an evaluation test of the machine learning model provided by the provider 101, with the validation data from the user 102. To initiate the process, both machine learning model and validation data must be encrypted. During validation both machine learning and evaluation will remain encrypted, that is, during the processing of information and afterwards nothing but the result will be visible for both provider and user. The provider executes a step known as setup in homomorphic encryption 103, where the public homomorphic encryption parameters are created which include a scheme. The scheme defines the precision and efficiency of the computation, being BFV (Brakerski-Fan-Vercauteren) where exact arithmetic vectors of numbers are used at the cost of computational cost. This may be mandatory if machine learning model deals with high precision data and cannot afford a loss in accuracy. Or the scheme being CKKS (Cheon-Kim-Kim-Song) which deals with approximate arithmetic on vectors of numbers, more efficient computationally and ideal for application where a small accuracy loss is not prohibitive. This parameter choice must be accorded beforehand with both parties as it will be dependent on the data being input by user and the precision needed for the task. Moreover, the provider can additionally create Security Parameters or Functionality Parameters like Cyclotonic ring, modulus, and/or level depth. The Public Parameters created by the provider are sent to the user 104. In this step or a subsequent step an encoding method 105 must also be chosen by both parties, as it heavily impacts performance. If a stricter encoding is used (block size of 256 bits), preferred methods such as Galois keys (block size of 128 bits), cannot be used. The choice depends on how strict both interested parties want the key security to be. Next user runs a key generation method for creating the public keys (public evaluation keys) 106 that are going to be used during the transaction process. The user now sends the evaluation data in its encrypted form to the provider along with the public evaluation keys 107. After that, the provider can now perform a homomorphic inference 108 on the evaluation data sent by the user using its public evaluation keys. That is the process of validating and processing the encrypted evaluation data sent by the user, while this is fed to the encrypted machine learning model envisioned by the provider. The encrypted results of this processing are sent to both interested parties 109, provider and user. Both parties can now decrypt the results and evaluate whether the performance of the model is satisfactory with the given input data delivered by the user 110. Note that both accuracy and time efficiency in execution are affected by the encryption method and the parameters chosen 105. However, it is possible to estimate if the provider can execute the machine learning model with input data that has a similar batch size (in samples, parameters, fields etc.) that the one provided encrypted by the user. If this information (batch size) can be purveyed, the provider can beforehand provide an error rate on accuracy that using encryption incurs and, also, a delta on how much time is added to processing to the user. This information can be especially useful if accuracy or efficiency is key for user's target use of the machine learning model.

FIG. 2 shows that the number of times the evaluation 105, 106, 107, 108, 109, 110 may be run must be limited for several reasons, if the provider wants to avoid the risk of extraction attacks, executions/queries to the model must be limited, or a very tight encoding must be chosen 105 to make such extraction attacks computationally infeasible due to cost. The former is preferred as it is a simpler solution which attends the needs of both, provider and user if evaluating the model with given data while encrypted is the target. On occasion that the user offers interest to buy the model provided by the provider after obtaining said results, a deal can be made 111, and the unencrypted machine learning model can be provided to the user. The user can validate with the same unencrypted evaluation data if the results of accuracy and efficiency of the model is on par with said evaluated encrypted machine learning model. On occasion that the results of accuracy and efficiency of the model is not on par with said evaluated encrypted machine learning model the step of processing by the machine learning model may be repeated with another unifying coding method 112. Thereby, the number of repeated processing of the machine learning model may be limited to a predetermined threshold n that is to avoid the risk of extraction attacks. Further steps can be taken by the provider if redistribution of the provided machine learning model is not to occur, with the use of neural network watermarking. Neural network watermarking can trace, if a said model is the same as a target machine learning model that could not be legally distributed. All said steps describe a process that secures information for both parties, the detainer of data and the detainer of machine learning model where both have data encrypted. This ensures that the disclosed machine learning model does not have its implementation details and inner optimizations revealed. It also ensures that the input data for the machine learning model is also protected if any privacy-sensitive information is contained.

Figure 3:
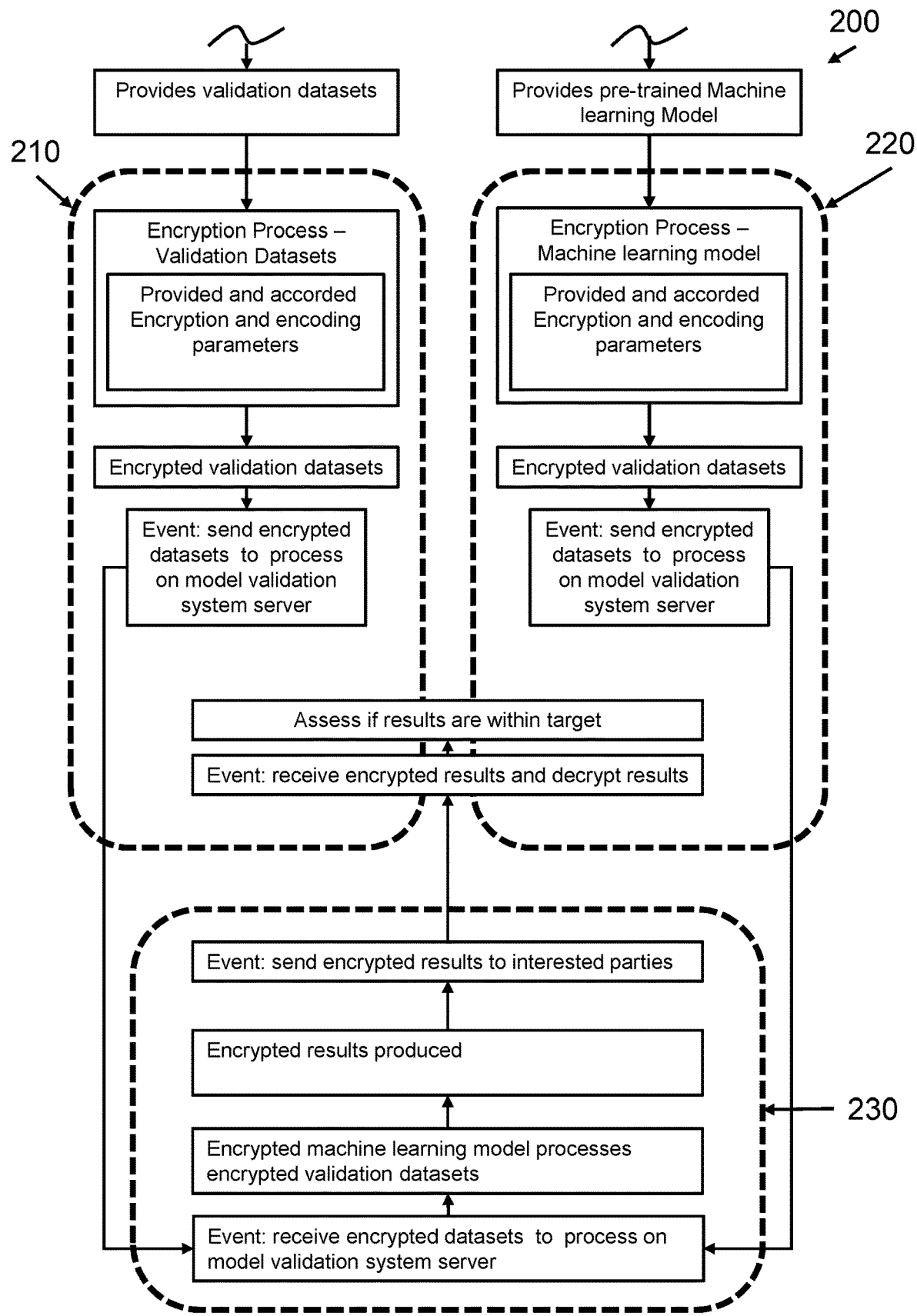
FIG. 3 illustrates a graphical scheme of system components configured to perform steps of the method for secure validation of machine learning models and parallel validation data using homomorphic encryption according to another embodiment of the invention.

FIG. 3 illustrates putative system components configured to perform certain steps of the method for secure validation of machine learning models and parallel validation data using homomorphic encryption according to another embodiment of the invention. In this example, a system 200 comprises a local system 210 which belongs to an owner of a dataset to be validated. Further this system comprises a local system 220 which belongs to an owner of a trained machine learning model. However, these systems may also be network systems or cloud systems and may comprise several components like server, gateways, storages, databases etc. but may also be a single computer or workstation. Each such system can include one or more computer devices and/or communication devices that include hardware the include a processor connected to at least one transceiver and non-transitory memory as well as one or more input devices and one or more output devices.

Within the two systems 210 and 220, the data to be validated and the machine learning model are encrypted. As described in the method according to the invention, there is an exchange of information in certain steps with which parameters the encryption has to be carried out, so that the machine learning model can do anything at all with the encrypted validation data (for the sake of clarity, these steps are not shown in FIG. 3). After the respective encryption by the two systems 210 and 220, the encrypted components are transferred to another system 230. This validation system 230 includes, for example, a validation system server and performs validations of the encrypted data with the encrypted machine learning model. Occasionally, this system 230 can also be used to exchange information about the appropriate encryption parameters. The system 230 then also encrypts the results and sends them to the systems 210 and 220. The systems 210 and 220 can then decrypt and evaluate the results. However, it is also possible that the system 230 is within the sphere of the owner of the machine learning model or is even a component of the system 220.

It should be appreciated that different embodiments of the method, communication system, and communication apparatus can be developed to meet different sets of design criteria. For example, the particular type of network connection, server configuration or client configuration for a device for use in embodiments of the method can be adapted to account for different sets of design criteria. As yet another example, it is contemplated that a particular feature described, either individually or as part of an embodiment, can be combined with other individually described features, or parts of other embodiments. The elements and acts of the various embodiments described herein can therefore be combined to provide further embodiments. Thus, while certain exemplary embodiments of a telecommunication apparatus, telecommunication device, computer device, a network, a server, a communication system, and methods of making and using the same have been shown and described above, it is to be distinctly understood that the invention is not limited thereto but may be otherwise variously embodied and practiced within the scope of the following claims.

What is claimed is:

1. A method for secure validation of machine learning models and parallel validation data using homomorphic encryption, comprising:
   providing, by a provider, a machine learning model and providing, by a user, validation data;
   encrypting, by the provider, the machine learning model;
   sending, by the provider, a public encryption parameter to the user;
   selecting, by the user and provider, a unifying encoding method;
   encrypting, by the user, the validation data;
   sending, by the user, the encrypted validation data;
   processing, the encrypted validation data with the encrypted machine learning model;
   providing encrypted results of said processing to the provider and the user;
   decrypting the results and evaluating whether the performance of the machine learning model is satisfactory with the given valuation data of the user; and
   wherein the step of processing, the encrypted validation data with the encrypted machine learning model is repeated with another unifying coding method in case the result of the machine learning model does not meet the requirements for accuracy and efficiency.

2. The method according to claim 1, wherein:
   the step of encrypting, by the provider, the machine learning model further comprises generating, by the provider, public, secure and/or functionality homomorphic encryption parameters; and
   the method further comprises sending, by provider, the homomorphic encryption parameters to user.

3. The method according to claim 2, wherein the public homomorphic encryption parameters comprising a scheme defining the precision and efficiency of the subsequent processing of the encrypted validation data with the encrypted machine learning model, wherein the scheme is a Brakerski-Fan-Vercauteren (BFV) or a Cheon-Kim-Kim-Song (CKKS) scheme.

4. The method according to claim 3, wherein the functionality homomorphic encryption parameters comprising one of cyclotonic ring, modulus (modulo) and/or level depth.

5. The method according to claim 1, wherein the unifying encoding method use a block size of n=256 bits or a block size of n=128 bits.

6. The method according to claim 1, wherein the step of encrypting, by the user, the validation data (further comprises generating, by user, public keys that are going to be used during the transaction process; and wherein the method further comprising the steps:
sending, by user, the encrypted validation data and the generated public keys to the provider; and
processing, the encrypted validation data with the encrypted machine learning model, wherein the public keys of user are used.

7. The method according to claim 1, wherein the number of repeated processing of the machine learning model is limited to a predetermined threshold n that is to avoid the risk of extraction attacks.

8. A method for secure validation of machine learning models and parallel validation data using homomorphic encryption, comprising:
providing, by a provider, a machine learning model and providing, by a user, validation data;
encrypting, by the provider, the machine learning model;
sending, by the provider, a public encryption parameter to the user;
selecting, by the user and provider, a unifying encoding method;
encrypting, by the user, the validation data;
sending, by the user, the encrypted validation data;
processing, the encrypted validation data with the encrypted machine learning model;
providing encrypted results of said processing to the provider and the user;
decrypting the results and evaluating whether the performance of the machine learning model is satisfactory with the given valuation data of the user; and
wherein a neural network watermarking is used to trace the machine learning model upon a determination that a redistribution of the provided machine learning model is not to occur.

9. The method according to claim 1, wherein the method is executed on an online external system, a public cloud solution, and/or a private offline system.

10. A system for secure validation of machine learning models and parallel validation data using homomorphic encryption, the system comprising a provider and a user, the provider including a computer device having a processor connected to a non-transitory computer readable medium, the user including a computer device having a processor connected to a non-transitory medium; the user being communicatively connectable to the provider, wherein the system is configured such that
a machine learning model is providable via the provider and validation data is providable via the user;
the provider configured to encrypt the machine learning model and send a public encryption parameter to the user;
the user and the provider configured to select a unifying encoding method;
the user configured to encrypt the validation data and send the validation data so that the validation data is processable by the encrypted machine learning model to output encryption results that are providable to the user and the provider, the user and the provider being configured to decrypt the encryption results and evaluate whether the machine learning model performed satisfactorily with the valuation data, and in response to the machine learning model performing unsatisfactorily with the valuation data and does not meet requirements for accuracy and/or efficiency, the encrypted machine learning model processing of the validation data is repeatable with another unifying coding method.

11. The system according to claim 10, wherein the system comprising at least one of online external system, public cloud solution system and/or private offline system.

12. The system of claim 10, wherein the user is a component of an online external system, a public cloud computer system, a private offline system, a local system, a network system and/or cloud system.

13. The system of claim 10, wherein the provider is a component of an online external system, a public cloud computer system, a private offline system, a local system, a network system and/or cloud system.

14. The method of claim 1, wherein the provider includes a computer device having a processor connected to a non-transitory computer readable medium and the user includes a computer device having a processor connected to a non-transitory medium.

15. The method of claim 14, wherein the user is a component of an online external system, a public cloud computer system, a private offline system, a local system, a network system and/or cloud system.

16. The method of claim 13, wherein the provider is a component of an online external system, a public cloud computer system, a private offline system, a local system, a network system and/or cloud system.

17. The method of claim 8, wherein the provider includes a computer device having a processor connected to a non-transitory computer readable medium and the user includes a computer device having a processor connected to a non-transitory medium.

18. The method of claim 17, wherein the user is a component of an online external system, a public cloud computer system, a private offline system, a local system, a network system and/or cloud system.

19. The method of claim 17, wherein the provider is a component of an online external system, a public cloud computer system, a private offline system, a local system, a network system and/or cloud system.

* * * * *